3,417,618
THERMOCOUPLE PROBE ASSEMBLY AND TEMPERATURE SENSING CIRCUITS COMPRISING THE SAME
Milton J. Morrisette, Ashland, Mass., assignor to Fenwal Incorporated, Ashland, Mass., a corporation of Massachusetts
Filed May 31, 1966, Ser. No. 553,795
2 Claims. (Cl. 73—359)

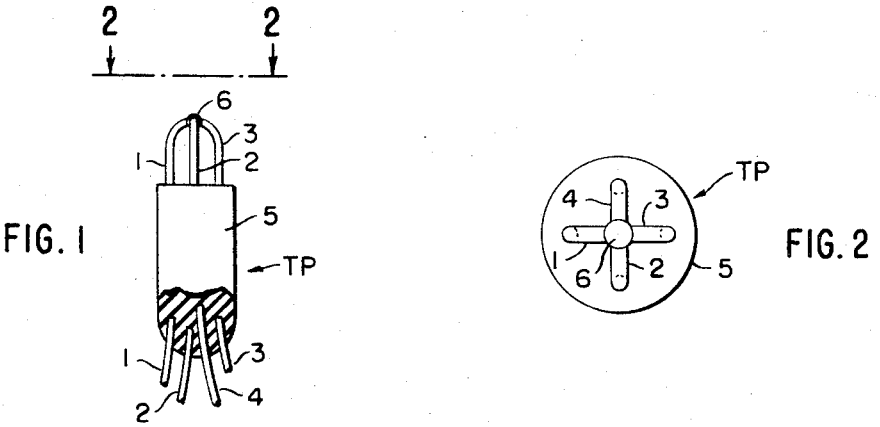
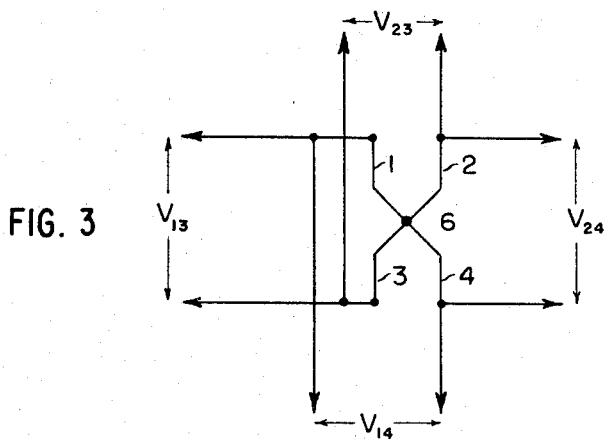
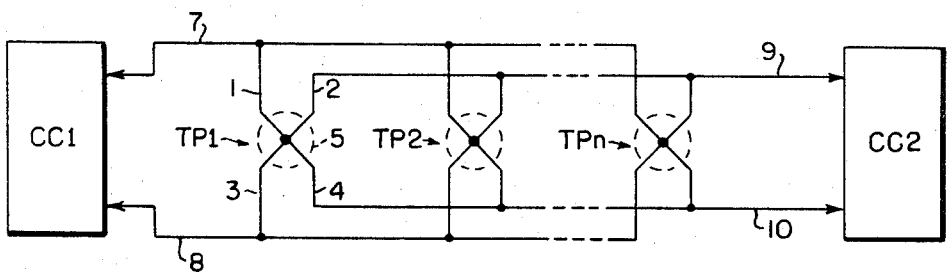
INVENTOR.
MILTON J. MORRISETTE
ATTORNEYS

United States Patent Office 3,417,618
Patented Dec. 24, 1968

ABSTRACT OF THE DISCLOSURE

A thermocouple probe having two pairs of conductors extending through an insulating support. Each pair of conductors is of the same metal and is different from the metal of the other pair. Two of the conductors extend from the end of the insulator in one plane and the other two in a plane normal to the first plane for resistance to vibration. These ends of the conductors are electrically and mechanically connected together in a single common junction which lies on the line defining the intersection of the two planes, so as to form a pair of identical thermocouple junctions.

My invention relates to temperature measurement, and particularly to a novel thermocouple probe assembly and circuits comprising the same.

Thermocouples are frequently used to measure temperature in environments where the temperatures are relatively high, or where vibration and thermal shock are frequently encountered. Where accuracy and speed of response are important, it is highly desirable that the thermocouple junction be in direct contact with the substance whose temperature is to be measured. It has long been a problem that the relatively fragile structure, which includes the extending leads of dissimilar metal and their junction, has a relatively short life under severe conditions of operation. It is a first object of my invention to improve the service life and reliability of thermocouple measuring apparatus.

A particular problem to which my invention relates involves the control of electrically independent circuits in response to the temperature of a space to be monitored. The difficulty arises whether a single temperature is sensed, or whether a number of junctions are provided and connected in parallel to produce an average temperature indication. It has been common practice to provide, for each such independent circuit to be controlled and each such junction temperature to be measured, a pair of thermocouple junctions spaced as closely as possible together to respond in common to the temperature to be sensed. However, even very closely spaced thermocouple junctions rarely give identical output signals. The use of pairs of junctions for each sensing location may be preferred to the use of a single junction with isolating amplifiers for various reasons. For example, a typical problem of this kind is encountered in the measurement of the gas temperature in the exhaust section of a jet aircraft. In such installations, it is desirable to have a temperature indication available as information for the operator of the aircraft, and also to have a temperature signal independently available for use in controlling the supply of fuel to the engine. Electrically independent temperature signals are desirable, because the voltage drop in the leads of one thermocouple caused by the current drawn in the indicating circuit would cause interference if the same circuit was used to supply the control system. Also, if the automatic fuel control system failed because of a break in the thermocouple circuits, it would be highly desirable to have a temperature signal available to the pilot for use in manual fuel control. For the same reason, failure of the indicating system should not cause failure of the manual system. For this application, average temperature signals are desired, and it is common to connect a plurality of pairs of adjacent junctions at different locations in the exhaust section, and to connect corresponding junctions in parallel, so that a pair of average temperature signals are produced. Because of differences in materials, differences in the locations of two thermocouples, and dynamic effects produced by turbulence in the region to be monitored, it has been found difficult to cause the control signal to track with the indication signal even though the adjacent thermocouple junctions are placed quite close together. A second object of my invention is to make it possible to control electrically independent circuits in response to the same measured temperature.

Briefly, the objects of my invention are attained by a novel thermocouple probe construction comprising a common junction of four lead wires mounted in a single insulating probe. Two of the wires are of one metal, and the other two are of a second metal suitable for producing a desired electromotive force in response to the junction temperatures in the desired region. Preferably, the thermocouple wires comprise two pairs lying in orthogonal planes, such that the upstanding portions of the thermocouple wires and their common junction form an assembly that is mechanically stiff in any direction. In addition to the mechanical advantages of strength and mechanical reliability of the arrangement, a surprisingly high degree of electrical redundancy, and hence versatility and electrical reliability, are achieved.

The construction of the thermocouple assembly of my invention, and its mode of operation, will best be understood in the light of the following detailed description, together with the accompanying drawings, of various embodiments thereof.

In the drawings:

FIG. 1 is an elevational sketch of a thermocouple assembly in accordance with my invention;

FIG. 2 is a plan view of the apparatus of FIG. 1, taken substantially along the lines 2—2 in FIG. 1;

FIG. 3 is a schematic wiring diagram of the thermocouple assembly of FIGS. 1 and 2; and FIG. 4 is a schematic wiring diagram of a temperature-sensing circuit in accordance with my invention.

FIG. 1 shows a thermocouple probe assembly TP comprising an insulating support designated as 5, which may be of any conventional construction adapted to be extended through a thermal barrier, such as the wall of a combustion chamber or the like, and to carry the leads of the thermocouple assembly in mutually spaced, insulated relation. Four electrically conductive leads 1, 2, 3 and 4 pass through the insulating member 5. Two of these leads are of one metal, such as platinum, and the other two are of a different metal, such as platinum-rhodium, or the like. In the broader aspects of my invention, it is contemplated that the arrangement and the order of the wires 1–4 will be selected in dependence on the several conditions and requirements characteristic of the particular environment in which the apparatus is to be used. However, in general it is preferred that the wires be more or less symmetrically disposed so that a pair of leads such as 1 and 3 lie in a plane that is normal to the plane in which the wires such as wires 2 and 4 lie. As indicated, the wires 1 through 4 are joined in a common junction 6, as by welding or the like. If desired, each pair of leads of the same metal may be formed from a single wire bent and jointed to the wire forming the other pair at a single welded junction. The structure thus formed which protrudes above the end of the insulating member 5 is structurally rigid and resistant to vibration in any direction.

Referring to FIG. 3, I have shown schematically the electrical circuit corresponding to the structure of FIGS. 1 and 2, and have illustrated the four pairs of points at which output voltages may be sensed. For purposes of illustration, it will be assumed that wires 1 and 2 are of one metal, and that wires 3 and 4 are of another metal.

As illustrated, the voltages $V_{13}$, $V_{23}$, $V_{24}$ and $V_{14}$ are all available as output signals. These output voltages may be utilized in any desired way, but for example, the pair of voltages $V_{13}$ and $V_{24}$ may be employed to control independent electrical circuits. The output voltages will tend to be very close to the same value, as the temperature gradient in the region of the junction 6 encompassing the metal-to-metal interface or interfaces would be expected to be very small. The additional structural strength of the junction makes it less likely to fail. At the same time, should any lead be broken, a substitute connection could be made without removing the probe assembly from the installation. For example, if the lead 2 were broken between its output terminal and the junction 6, an external jumper connection could be made to the lead 1, which would still provide a useful output signal.

FIG. 4 shows one manner in which two independent electrical circuits, shown schematically at CC1 and CC2, can be controlled in accordance with the same average temperature measured at a plurality of points in a space to be monitored. A number of probe assemblies TP1, TP2, and so on to a last one TPN, are arranged at desired points in a space to be monitored. Each of these thermocouple assemblies may be of the same construction as that described in connection with FIGS. 1–3. As shown, the external terminals of the leads such as 1 are connected together to a common lead 7, and the external terminals of the leads such as 3 are connected together to a common lead 8. The leads 7 and 8 are used to supply a signal to the circuit CC1 proportional to the average of the temperatures sensed at the junctions.

A similar circuit is provided for controlling the circuit CC2, comprising a lead 9 connected in common to all the terminals such as 2, and a lead 10 connected in common to all the terminals such as 4. As a practical example of the utilization of the circuit of FIG. 4, the circuit CC1 could comprise an indicator circuit for indicating to the pilot the temperature in the exhaust section of a jet engine, and the circuit CC2 could be employed to control the supply of fuel to the engine in a known manner to maintain the temperature at a desired value.

While I have described the apparatus of my invention with respect to particular details of illustrative embodiments thereof, many changes and variations will be apparent to those skilled in the art upon reading my description, and such can obviously be made without departing from the scope of my invention.

Having thus described my invention, what I claim is:

1. Apparatus for controlling two electrically independent circuits, each having a pair of control terminals, in dependence on the average temperature of a space to be monitored, comprising a set of insulating members extending into the space to be monitored at a corresponding set of different representative locations in the space, four rigid wires extending through, and supported by each insulating member and mechanically and electrically joined together at a single common junction point in the space to be monitored, a first pair of said wires for each insulating member comprising a first metal and a second pair of wires for each insulating member comprising a second metal, means connecting one wire of each first pair to one control terminal of a first of said circuits, means connecting one wire of each second pair to the other control terminal of the first circuit, means connecting the other wire of each first pair to one control terminal of the second of said circuits, and means connecting the remaining wires to the other control terminal of the second circuit, whereby each circuit receives a signal that is the same function of the same set of temperatures in the space to be monitored.

2. A thermocouple assembly, comprising first, second, third and fourth rigid conductors, said first and second conductors consisting of a first metal and said third and fourth conductors consisting of a second metal, an insulator mechanically supporting said conductors together in spaced insulated relation intermediate first and second ends of each conductor, two of said conductors lying in a first plane, the others of said conductors lying in a second plane normal to said first plane, and means electrically and mechanically joining said second ends of said conductors in a single common junction lying on the line defined by the intersection of said planes, thereby forming a structure which is rigid and resistant to vibration.

References Cited

UNITED STATES PATENTS

| | | | |
|---|---|---|---|
| 3,165,426 | 1/1965 | Beckman | 73—359 XR |
| 3,260,113 | 7/1966 | Benson et al. | 73—359 |
| 1,887,827 | 11/1932 | Uehling | 73—359 |
| 2,930,827 | 3/1960 | Schunke. | |
| 3,120,126 | 2/1964 | Bock | 73—359 |

FOREIGN PATENTS 694,013   7/1940   Germany.

S. CLEMENT SWISHER, *Acting Primary Examiner.*

F. SHOON, *Assistant Examiner.*

U.S. Cl. X.R.

136—230